United States Patent
van Bemmel

(10) Patent No.: US 10,567,271 B2
(45) Date of Patent: Feb. 18, 2020

(54) TOPOLOGY-AWARE PACKET FORWARDING IN A COMMUNICATION NETWORK

(71) Applicant: Alcatel-Lucent Canada Inc., Ottawa (CA)

(72) Inventor: Jeroen van Bemmel, Calgary (CA)

(73) Assignee: Nokia Canada Inc., Ottawa (CA)

( * ) Notice: Subject to any disclaimer, the term of this patent is extended or adjusted under 35 U.S.C. 154(b) by 803 days.

(21) Appl. No.: 14/256,040

(22) Filed: Apr. 18, 2014

(65) Prior Publication Data

US 2015/0304208 A1    Oct. 22, 2015

(51) Int. Cl.
*H04L 12/721* (2013.01)
*H04L 29/12* (2006.01)
*H04W 40/20* (2009.01)

(52) U.S. Cl.
CPC .............. *H04L 45/14* (2013.01); *H04L 45/66* (2013.01); *H04L 61/2503* (2013.01); *H04L 61/6004* (2013.01); *H04W 40/20* (2013.01); *H04L 61/2038* (2013.01); *H04L 61/609* (2013.01); *H04L 61/6022* (2013.01); *H04L 61/6068* (2013.01)

(58) Field of Classification Search
CPC .. H04L 67/14; H04L 67/1042–67/1093; H04L 45/00–45/24
See application file for complete search history.

(56) References Cited

U.S. PATENT DOCUMENTS

| | | | | |
|---|---|---|---|---|
| 8,560,646 | B1* | 10/2013 | Sivasubramanian | H04L 41/08 705/7.32 |
| 2008/0270387 | A1* | 10/2008 | Weitenberner | G06F 17/30678 |
| 2011/0185064 | A1* | 7/2011 | Head | G06F 9/5077 709/226 |
| 2012/0236761 | A1* | 9/2012 | Yang | H04L 61/103 370/259 |
| 2012/0243403 | A1* | 9/2012 | Hu | H04L 61/103 370/217 |
| 2012/0243539 | A1* | 9/2012 | Keesara | H04L 45/66 370/392 |
| 2013/0145008 | A1* | 6/2013 | Kannan | H04L 45/586 709/223 |
| 2013/0198355 | A1* | 8/2013 | Kalyanaraman | H04L 67/34 709/223 |
| 2014/0089484 | A1* | 3/2014 | Chin | H04L 41/00 709/223 |
| 2014/0105211 | A1* | 4/2014 | Hui | H04L 45/02 370/392 |

(Continued)

OTHER PUBLICATIONS

"Mapping IP Multicast to MAC-Layer Multicast," http://technet.microsoft.com/en-us/library/cc957928.aspx, Apr. 9, 2014, 2 pages.

*Primary Examiner* — Clayton R Williams
(74) *Attorney, Agent, or Firm* — Ryan, Mason & Lewis, LLP

(57) ABSTRACT

A method includes forwarding one or more packets from a first addressable computing element to at least a second addressable computing element based on a topology-aware address assigned to the second addressable computing element. The topology-aware address includes a set of identifiers representing one or more topology attributes associated with the second addressable computing element.

24 Claims, 4 Drawing Sheets

(56) References Cited

U.S. PATENT DOCUMENTS

2015/0110124 A1* 4/2015 Armstrong .............. H04L 49/70
  370/412
2015/0135178 A1* 5/2015 Fischer ................... H04L 67/10
  718/1
2015/0195137 A1* 7/2015 Kashyap ............. H04L 41/0893
  370/254

* cited by examiner

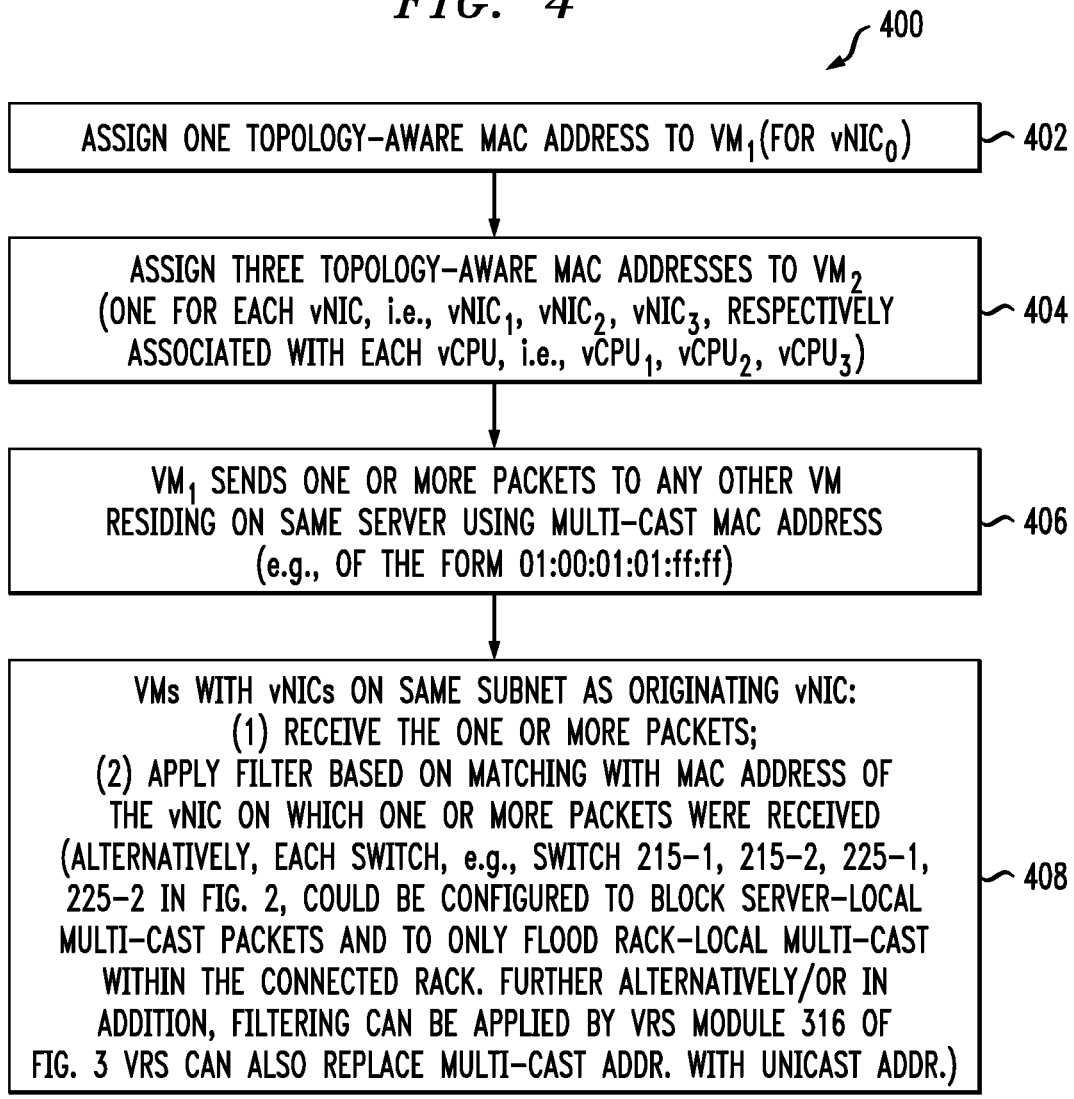

TOPOLOGY-AWARE PACKET FORWARDING IN A COMMUNICATION NETWORK

FIELD

The application relates generally to communication networks, and more particularly to communication protocols implementing packet forwarding functionality.

BACKGROUND

Standard Internet Protocol (IP) routing and Layer 2 (L2) switching/forwarding allow computers coupled via a communication network to exchange packets of data. As is known, L2 refers to the data link layer of the multilayered communication model, Open Systems Interconnection (OSI). In current data centers that implement virtualization of computing resources via one or more hypervisors, virtual machines (VMs) are hosted by such computers and the VMs exchange packets. While there are known mechanisms for packet forwarding in a communication network, there is no support for some critical use cases that have specific reliability and latency requirements.

Cloud management platforms, such as Openstack™ or Amazon™, support placement of VMs in specific availability zones or even in specific racks or servers. However, the cloud application is typically unaware of the underlying topology. It is possible for a VM to attempt to discover another VM on the same server, for example, but this implies that such state (i.e., which VMs are running, what IP addresses do they have, etc.) exists in multiple places. If the target VM is subsequently taken down, the application must be notified such that it can select another server, leading to complex application programming interfaces, state inconsistencies and general unpredictable/unreliable behavior of the system.

SUMMARY

Illustrative embodiments of the invention provide topology-aware packet forwarding techniques for use in a communication network. While embodiments are applicable to varied types of communication networks, one or more embodiments are particularly well-suited for use in a cloud network.

In one embodiment, a method comprises forwarding one or more packets from a first addressable computing element to at least a second addressable computing element based on a topology-aware address assigned to the second addressable computing element. The topology-aware address comprises a set of identifiers representing one or more topology attributes associated with the second addressable computing element.

For example, the one or more packets from the first addressable computing element may also be forwarded to one or more other addressable computing elements having at least one topology attribute in common with the second addressable computing element.

By way of further example, the set of identifiers representing the one or more topology attributes may comprise one or more of a data center location identifier, a rack identifier, a server identifier, a socket identifier, a core identifier, and a hyper-thread identifier.

In one example, an addressable computing element comprises a virtual machine.

Advantageously, illustrative embodiments of the invention enable processing devices in a communication network to send packets to other processing devices of the communication network with certain reliability and relative latency characteristics but without requiring explicit topology discovery or state synchronization being performed.

These and other features and advantages of the present invention will become more apparent from the accompanying drawings and the following detailed description.

BRIEF DESCRIPTION OF THE DRAWINGS

FIG. 4 shows a topology-aware packet forwarding methodology according to an embodiment of the invention.

DETAILED DESCRIPTION

Illustrative embodiments of the invention will be described herein with reference to exemplary communication networks, user devices, network nodes, and associated communication protocols. It should be understood, however, that embodiments of the invention are not limited to use with the particular arrangements described, but are instead more generally applicable to any communication network application in which it is desirable to provide improved packet forwarding functionality.

As used herein, the phrase "addressable computing element" refers to any given computing element that can be electronically communicated with by sending data thereto using a destination address consistent with an address associated with the given computing element. Examples of addressable computing elements include, but are not limited to, virtual machines, physical servers, Linux containers, etc. Thus, while illustrative embodiments herein illustratively refer to virtual machines, it is to be understood that inventive techniques described herein are not limited to implementation with virtual machines.

Figure 1:
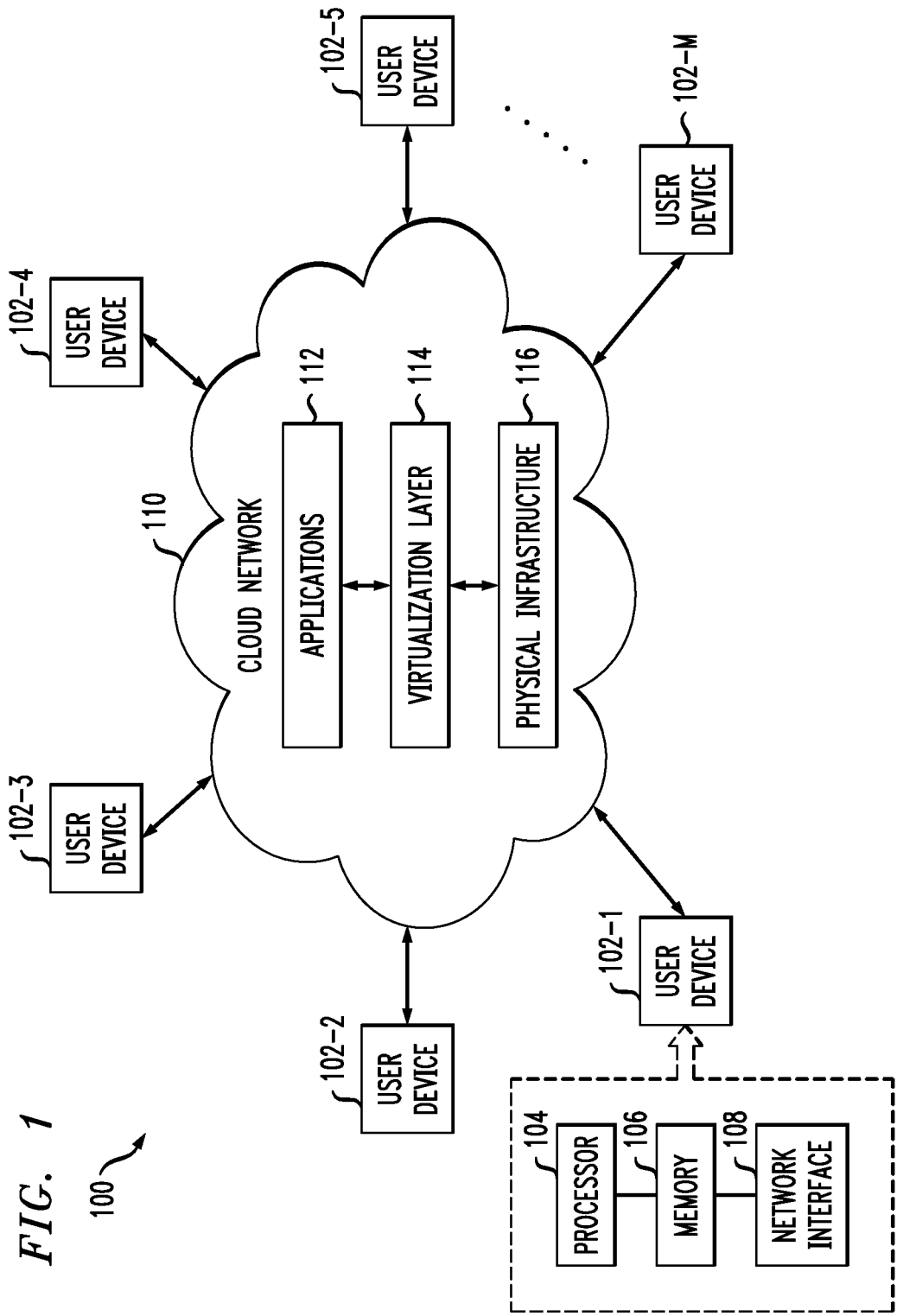
FIG. 1 shows a communication network environment in which one or more embodiments of the invention are implemented.

FIG. 1 shows a communication network environment 100 in which one or more embodiments of the invention are implemented. More particularly, as shown, a plurality of user devices 102-1 through 102-M are connected to a cloud network 110. The user devices may, for example, be mobile user devices (e.g., smartphones, laptops, and/or other typically mobile computing or processing devices), fixed user devices (e.g., desktops, servers, and/or other typically non-mobile computing or processing devices), or combinations thereof.

Each user device 102 (as shown, by way of example, for user device 102-1) comprises a processor 104, a memory 106, and a network interface 108, operatively coupled to one another. It is assumed that the processor 104 is configured to direct the operation of the corresponding user device 102 by executing software that is stored in the memory 106. The network interface 108 includes network interface circuitry to allow the user device 102 to communicate with the cloud network 110, and thus with one or more other user devices 102. Such network interface circuitry includes one or more conventional transceivers as well as other related circuitry used to support communication and other protocols mentioned herein.

The processor 104 may be implemented utilizing a microprocessor, a microcontroller, an application-specific integrated circuit (ASIC), a field-programmable gate array (FPGA), or other type of processing circuitry, as well as portions or combinations of such processing circuitry. A given such processor may include one or more embedded memories as internal memories. As indicated above, the processor 104 and any associated internal or external memory may be used in storage and execution of one or more software programs for controlling the operation of the corresponding user device 102.

The memory 106 may include one or more storage areas that may be utilized for program code storage. The memory 106 may therefore be viewed as an example of what is more generally referred to herein as a processor or computer-readable storage medium that has executable program code embodied therein. Other examples of computer-readable storage media may include disks or other types of magnetic or optical media, in any combination. Articles of manufacture comprising such computer-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

The memory 106 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

As further shown in FIG. 1, cloud network 110 includes applications 112, virtualization layer 114, and physical infrastructure 116, operatively coupled to one another. The phrase "virtualization layer," as used herein is intended to generally refer to groups of virtual computing resources including, but not limited to, virtual machines (VMs), virtual central processing units (vCPUs), virtual network interface cards (vNICs), virtual cores (or simply "cores"), virtual sockets (or simply "sockets"), and hyper-threads (HTs). The virtualization layer 114 is managed by one or more hypervisors (assumed to be part of layer 114) which allocate each available virtual resource to satisfy the demands of a given application 112.

The physical infrastructure 116 may include, by way of example only, servers, computers, processing devices, storage arrays, and other physical computing and/or storage resources. It is to be appreciated that the same or a similar computing architecture (i.e., processor 104, memory 106, network interface 108, etc.) as that shown in FIG. 1 for user device 102, and as described above, can be used to implement the physical resources of physical infrastructure 116. Thus, the processor 104, memory 106, network interface 108, and other components of the physical infrastructure 116 may include well-known circuitry suitably modified to implement at least a portion of the topology-aware packet forwarding functionality described herein. Conventional aspects of such circuitry are well known to those skilled in the art and therefore will not be described in detail herein.

Furthermore, it is to be understood that, in a data center implementation, the physical infrastructure 116 may include one or more data center locations wherein each location may include: one or more racks within which multiple servers reside, one or more packet switches, and one or more packet routers. Each location may also include other physical infrastructure not specifically mentioned here. Also, it should be understood that different data center locations can be geographically distributed or geographically collocated with respect to one another. Further, a given data center itself can be geographically distributed or geographically collocated.

As mentioned above in the background section, conventional packet forwarding protocols provide no support for some critical use cases that have specific reliability and latency requirements. Some examples of use cases that are not supported in known packet forwarding protocols include, but are not limited to, the following use cases: (1) sending a packet to all VMs residing on the same server; (2) sending a packet to at most two VMs residing in a different rack; (3) sending a packet to a VM in a different data center location; or sending a packet to a VM in the same server, or in the same rack if not available, or in another location as a last resort.

Such use cases are relevant for certain telecommunication applications, which may have specific reliability and latency requirements. For example, a given incoming call (e.g., coming from a user device 102) may be an emergency call and should be routed via two VMs in different data center locations such that even a complete site failure would not interrupt the call. Another example is a financial trading application which needs to forward stock data to another VM with the lowest possible latency (e.g., one residing in the same server, running on the same CPU core/socket).

With current data center networking technologies, applications have little control over the reliability and performance characteristics of the service they deliver. The resulting behavior is basically a 'best effort' service, without regard for locality of reference or chance at failures.

Accordingly, illustrative embodiments of the invention enable the design of applications that take advantage of the underlying network topology in which they are deployed, in order to implicitly realize lower average latency and/or higher availability and resiliency, as per application requirements (at a per-packet granularity level). This is accomplished, according to one or more embodiments, by using addressing with a specific topology-aware structure (i.e., a topology-aware address) to implement implicit addressing for the aforementioned and other packet forwarding scenarios. In such embodiments, application-VMs implement a topology-aware addressing scheme.

It is to be appreciated that the benefits of locality of reference are currently limited to a single server in the context of caching. Illustrative embodiments of the invention extend the locality of reference concept across the entire (virtual) network. That is, the topology-aware packet forwarding approach described herein allows applications to take advantage of data center topology and locality of reference without having to discover/cache the associated information. This makes such applications highly portable across different data center implementations, and allows them to execute more efficiently and with better protection against outages.

Illustrative embodiments of the topology-aware packet forwarding (addressing) approach will now be described below in the context of FIGS. 2-4.

Figure 2:
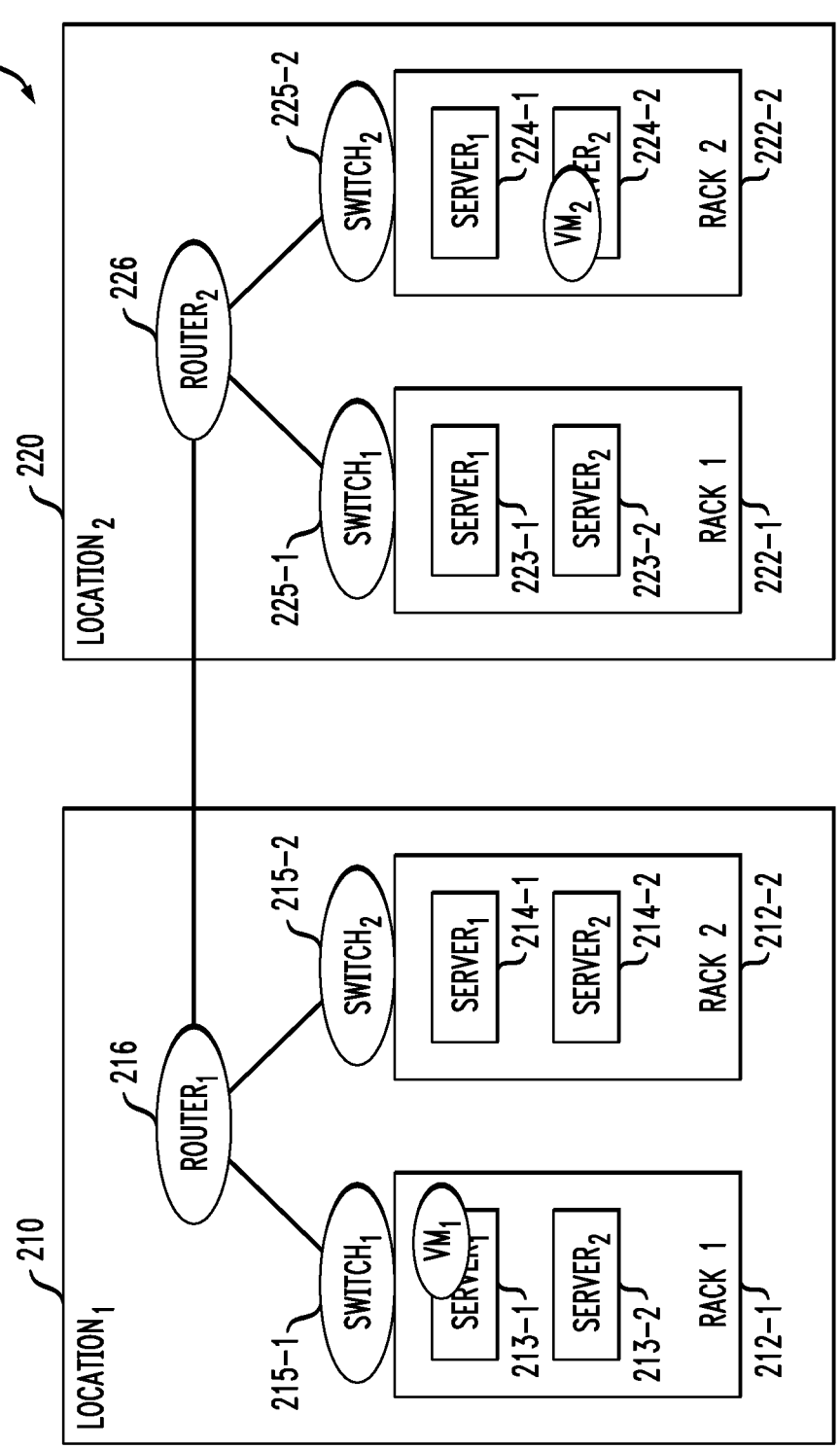
FIG. 2 shows a data center topology according to an embodiment of the invention.

FIG. 2 shows a data center topology according to an embodiment of the invention. In this example topology 200, a first data center location (location$_1$) 210 comprises a first rack (rack 1) 212-1, a second rack (rack 2) 212-2, a first packet switch (switch$_1$) 215-1, a second packet switch (switch$_2$) 215-2, and a packet router (router$_1$) 216. The first rack 212-1 comprises a first server (server$_1$) 213-1 and a second server (server$_2$) 213-2. The second rack 212-2 comprises a first server (server$_1$) 214-1 and a second server (server$_2$) 214-2. As further shown in FIG. 2, a second data center location (location) 220 comprises a first rack (rack 1) 222-1, a second rack (rack 2) 222-2, a first packet switch (switch$_1$) 225-1, a second packet switch (switch$_2$) 225-2, and a packet router (router$_2$) 226. The first rack 222-1 comprises a first server (server$_1$) 223-1 and a second server (server$_2$) 223-2. The second rack 222-2 comprises a first server (server$_1$) 224-1 and a second server (server$_2$) 224-2. By way of example only, FIG. 2 also shows a first virtual machine VM$_1$ hosted on server 213-1 and a second virtual machine VM$_2$ hosted on server 224-2.

It is to be understood that while the first and second data center locations show a specific number of racks, switches, routers, servers, and VMs, either or both locations may include more or less racks, switches, routers, servers and/or VMs than that which are shown in FIG. 2. Likewise, the network topology with which embodiments of the invention are implemented may include more or less locations than that which are shown in FIG. 2.

Figure 3:
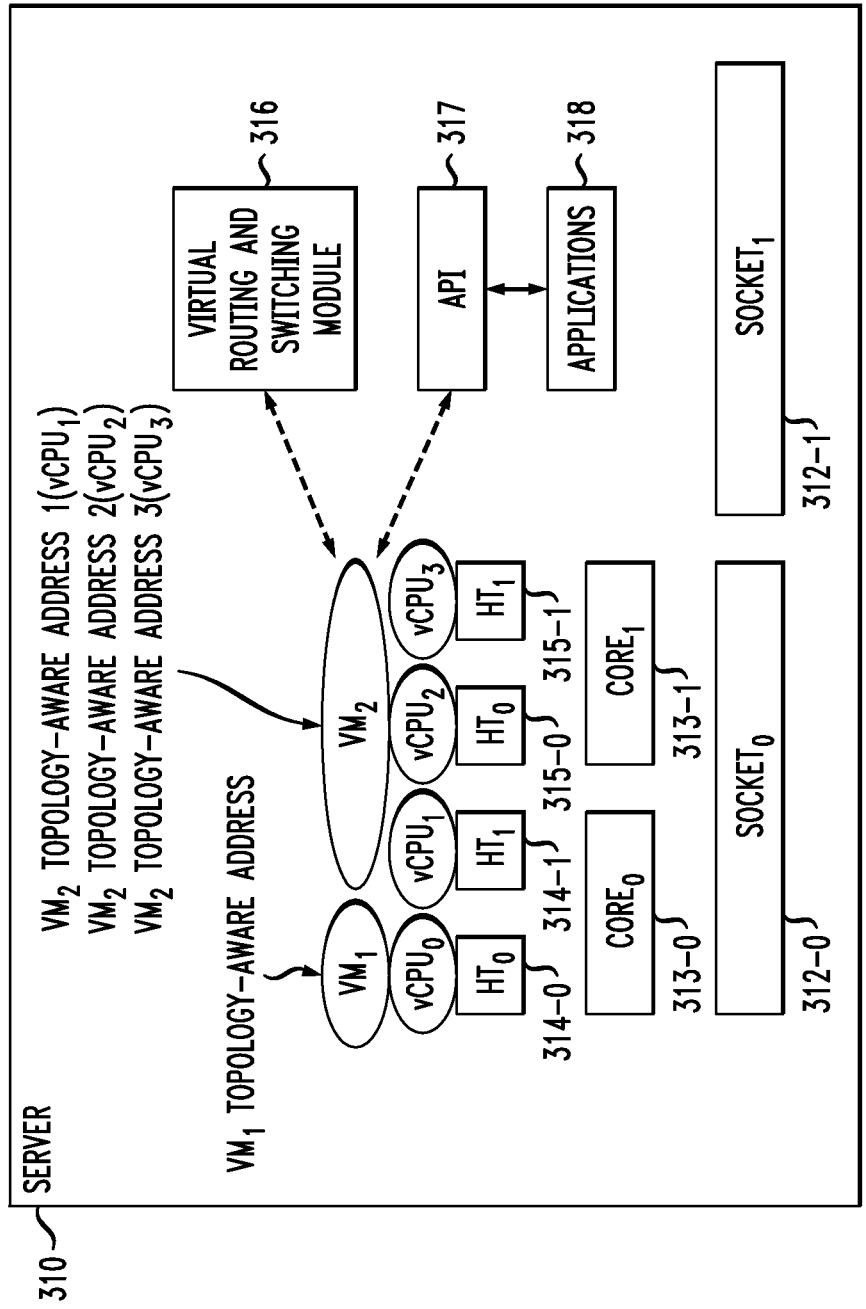
FIG. 3 shows an internal topology of a data center server according to an embodiment of the invention.

FIG. 3 shows an internal topology of a data center server according to an embodiment of the invention. For example, server 310 (which could be any one of the servers shown in FIG. 2) comprises a first virtual socket (socket$_0$) 312-0 and a second virtual socket (socket$_1$) 312-1. Socket 312-0 comprises a first virtual core (core$_0$) 313-0 and a second virtual core (core$_1$) 313-1. Core 313-0 comprises a first hyper-thread (HT$_0$) 314-0 on which vCPU$_0$ operates and executes VM$_1$ via a vNIC$_0$ (not expressly shown). Core 313-0 also comprises a second hyper-thread (HT$_1$) 314-1 on which vCPU$_1$ operates and executes part of VM$_2$ via a vNIC$_1$ (not expressly shown). Further, core 313-1 comprises a first hyper-thread (HT$_0$) 315-0 on which vCPU$_2$ operates and executes part of VM$_2$ via a vNIC$_2$ (not expressly shown). Core 313-1 also comprises a second hyper-thread (HT$_1$) 315-1 on which vCPU$_3$ operates and executes part of VM$_2$ via a vNIC$_3$ (not expressly shown). It is to be understood that hyper-threads share processing units, and cores share certain cache levels which means that allocation choices affect the performance of VMs. Also shown in server 310 of FIG. 3 is a virtual routing and switching (VRS) module 316, an application programming interface (API) 317, and applications 318, which will be explained in further detail below.

FIG. 4 shows a topology-aware packet forwarding (addressing) methodology according to an embodiment of the invention. The methodology 400 is described in the context of the network topology of FIGS. 2 and 3. The methodology 400 assumes an exemplary topology-aware addressing structure for VMs in the subject data center in which packets will be forwarded. However, given the teachings provided herein, alternative suitable topology-aware addressing structures covered by embodiments of the invention will be evident to those of ordinary skill in the art.

In one illustrative embodiment, VMs are assigned at least one topology-aware Media Access Control (MAC) address. For example, one topology-aware MAC address is assigned to a VM for each vNIC associated therewith. The MAC address assigned to a VM comprises the following 48-bit structure in one illustrative embodiment:

0x52:<location-id>:<rack-id>:<server-id>:<CPU socket-id>:<core-id|hyper-thread-id> where location-id refers to an identifier for a data center location (e.g., location 210, location 220, etc.), rack-id refers to an identifier for a rack in a given location (e.g., rack 212-1, rack 212-2, rack 222-1, rack 222-2, etc.), server-id refers to an identifier for a server in a given rack (server, 213-1, server 213-2, server 214-1, server 214-2, server 223-2, server 223-2, server 224-1, server 224-2, etc.), CPU socket-id refers to an identifier for a virtual socket (e.g., socket 312-0, 312-1, etc.), core-id refers to a virtual core (e.g., core 313-0, core 313-1, etc.), and hyper-thread-id refers to a hyper-thread (e.g., hyper-thread 314-0, hyper-thread 314-1, hyper-thread 315-0, hyper-thread 315-1). The identifiers serve as physical (e.g., location, rack, server, socket, core, hyper-thread) topology attributes. In an alternative embodiment, a rack may comprise multiple shelves and each shelf may contain one or more servers. As such, the assigned MAC address may also include a shelf-id parameter, wherein the shelf is another example of a physical topology attribute.

For example, VM$_1$ in FIG. 2 or FIG. 3 may be assigned MAC address 52:00:01:01:01:00. A multi-vNIC VM such as VM$_2$ may be assigned three MAC addresses (one for each vNIC, i.e., vNIC$_1$, vNIC$_2$, vNIC$_3$, respectively associated with each vCPU, i.e., vCPU$_1$, vCPU$_2$, vCPU$_3$), and would optionally be configured such that its CPU cores are aligned with the processing of packets from the corresponding vNIC (e.g., interrupt request or IRQ of vNIC$_0$ mapped to vCPU$_0$, etc.). These address assigning steps are illustrated in steps 402 and 404, respectively, of FIG. 4.

Then, in step 406, in order for VM$_1$ to send one or more packets to any other VM residing on the same server, VM$_1$ sends the one or more packets to a multicast MAC address (i.e., sets the destination address in the packets to the multicast MAC address) of the form 01:00:01:01:ff:ff (bit0=1 indicates a multicast address). The 'ff:ff' at the end of the address denotes a multicast to VMs running on any CPU socket/core-id/hyper-thread on the given server.

In step 408, then, all VMs with vNICs on the same subnet (e.g., same server) as the originating vNIC would receive the one or more multicast packet, and apply a filter based on matching with the MAC address of the vNIC on which it was received. Alternatively, each switch (e.g., switch 215-1, 215-2, 225-1, 225-2 in FIG. 2) can be configured to block server-local multicast packets, and to only flood rack-local multicast within the connected rack. In an alternative embodiment, e.g., based on Nuage VSP™, virtual networking can be applied and a switching/routing module (e.g., VRS module 316 in FIG. 3) can be deployed on every server. Instead of, or in addition to, each VM performing the filtering, the VRS module can apply the filtering logic when forwarding multicast packets received from VMs, providing an even more efficient implementation which works with standard VM operating systems/drivers. VRS could also replace the multi-cast MAC address with the unicast MAC address of the target server. That is, each VM would be configured with a multi-cast filter (in addition to its physical MAC address), or an intermediate element (e.g., VRS module) could replace the multi-cast address with the unicast MAC address of the destination VM as will be illustratively explained below.

Those of ordinary skill in the art will appreciate that the topology-aware packet forwarding (addressing) techniques described herein can be applied in various alternate ways. For example, IP addresses could be structured as addresses other than MAC addresses, e.g., using the IPv6 protocol with sufficient bits. In such case, however, VM moves would imply a change of IP address, causing local changes to propagate and be visible outside the data center/virtual network.

A number of further enhancements are possible with a VRS-based implementation. For example, a 'dual-cast' bit is added to the address (e.g., in the second byte) which, when set, causes the VRS module to forward the packet to at most two matching VMs for redundancy. By way of further example, a 'negate' bit is added for the various levels (i.e., site, rack, server, socket, etc.) to indicate that the packet should be delivered to any VM not running on a matching server. This embodiment can be used to implement anti-affinity rules. VMs can be tried in order of decreasing locality, i.e., first try matching server, then matching rack, etc.

Another embodiment comprises an API such as Openstack Nova™, which allows applications to launch additional VMs. By specifying the desired, structured MAC address, an application could express its preferences for the relative locality of the given VM (e.g., on the same server as the VM making the request, at a different location either specific or just unequal, etc.). That is, instead of addressing a packet to a specific (set of) server(s) using a MAC address, an application (e.g., 318 in FIG. 3) can be configured to use a structured MAC address as a parameter to a Nova «"launch VM"» API (e.g., 317) call to start one or more VM instances at the designated topological locations. The addressing can be absolute (e.g., "start a VM on rack 1, server 1, socket 1, CPU 2") or relative (e.g., "start a VM on the same server as the originating VM, but on a different (set of) CPUs") and it may vary in the degree of specification (e.g., "start a VM on a different server in the same rack, any CPU"). Note that the command can start one or more VMs (of the same type).

Yet another embodiment assigns topology-based unicast MAC addresses to servers (VM or physical) as described, e.g., 0x52:0x00:<location-id>:<rack-id>:<server-id>:<CPU socket-id | core-id | hyper-thread-id>. A server then addresses a packet to a VM at a specific location, rack, server, socket, core and hyper-thread, and the network in between performs regular switching as usual. This approach means the server knows which targets are addressable (e.g., by the way an application is deployed, on the same rack/server/socket/core/hyper-thread in different data centers, for example).

A further embodiment uses regular (random) MAC addresses for servers, but using multi-cast addressing with topology-based interpretation. For example, Internet standards (for Ethernet and Fiber Distributed Data Interfaces (FDDI)) assign the range of 01-00-5E-00-00-00 to 01-00-5E-7F-FF-FF for IP multicast. Thus, assume 03-x-x-x-x-x is selected as the range of multi-cast addresses for topology-aware packet forwarding (i.e., still with the multi-cast bit 01 set). A server will typically have a regular (random) MAC address that is unrelated to the topology. The server/VM is therefore not aware of the topology, but it can still address other servers in a topology-relative manner; e.g., 0x03:<#servers in different|same location>:<#servers in different|same rack>:<#VMs on different|same host>:<#VMs on different|same CPU socket>:< . . . core | . . . hyper-thread>, e.g., using 2 bits for 'different' and 6 bits for 'same' counts, except for the last octet core (2 different, 4 same) and hyper-thread (1 different, 1 same).

Sending a packet to 0x03:00:00:00:00:01 would then deliver the packet to at most one other VM running on the same hyper-thread. The interpretation of the destination MAC address is done by the VRS module, which calculates the target set based on the sending VM and its knowledge of the topology. The VRS module sends back an error packet (e.g., Internet Control Message Protocol (ICMP) host unreachable) in case no such VM exists.

As a second example, the address 0x03:00:00:80:00:00 would send a packet to a server on a different host in the same rack and location. This can be used to implement anti-affinity rules.

Similarly, 0x05-x-x-x-x-x is interpreted as progressively selecting servers starting from the lowest level (i.e., hyper-thread), and 0x07-x-x-x-x-x is the reverse (i.e., starting at different location). For example, 0x05:01:01:01:01:01 sends a packet to a VM on the same hyper-thread, or on the same core, or on the same socket, etc. until a VM is found. This results in the lowest latency connection to a different VM or server. 0x07:01:01:01:01:01 sends a packet to a VM in the same location but not in the same rack, then in the same rack, etc.

In an illustrative embodiment, a Nuage-based VRS module performs the matching logic and replaces the destination MAC address with the target's real MAC address when forwarding the packet. This means that the receiver would be unaware of the fact that a topological multicast was used. Alternatively, the VRS module can leave the destination MAC as-is, and the VM would then be configured to accept all packets to MAC 0x03-x-x-x-x-x, 0x05-x-x-x-x-x, etc.

Note that unicast MAC address embodiments described herein put less restriction on servers, i.e., a VM could be moved and a server could still address the VM; while embodiments that do not employ a unicast MAC address put less restriction on the network in between and can thus be used in any standard network environment.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing packet forwarding functionality. The particular manner in which the user devices and network nodes communicate can be varied in other embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:
1. A method comprising,
forwarding one or more packets from a first addressable computing element to at least a second addressable computing element based on a topology-aware address assigned to the second addressable computing element;
wherein the topology-aware address comprises a set of identifiers representing one or more topology attributes associated with the second addressable computing element;

wherein the first addressable computing element comprises a first virtual machine and the second addressable computing element comprises a second virtual machine;

wherein the topology-aware address comprises at least one indication used to control a number of different destination virtual machines having one or more specified physical topology attributes that the one or more packets are forwarded to, the number of different destination virtual machines being greater than one;

wherein the one or more specified physical topology attributes are defined relative to corresponding specified physical topology attributes of a locality of the first addressable computing element; and wherein the method is performed by at least one processing device comprising a processor coupled to a memory.

2. The method of claim 1, wherein the one or more packets from the first addressable computing element are also forwarded to one or more other addressable computing elements having at least one physical topology attribute in common with the second addressable computing element.

3. The method of claim 1, wherein the set of identifiers representing the one or more physical topology attributes comprise one or more of a data center location identifier, a rack identifier, a server identifier, a socket identifier, a core identifier, and a hyper-thread identifier.

4. The method of claim 1, further comprising applying a filter to the one or more packets to determine whether or not a match exists for the topology-aware address.

5. The method of claim 4, wherein the filter determines whether or not a match exists in a decreasing order of locality for a hierarchy of different physical topology attributes.

6. The method of claim 4, wherein the filter is applied by the second addressable computing element.

7. The method of claim 4, wherein the filter is applied by a switch in the network.

8. The method of claim 4, wherein the filter is applied by a virtual routing and switching module in the network.

9. The method of claim 8, wherein the virtual routing and switching module replaces a topology-aware destination address with the address of a target server.

10. The method of claim 1, wherein the topology-aware address comprises a topology-aware Media Access Control (MAC) address.

11. The method of claim 1, wherein the topology-aware address comprises a topology-aware Internet Protocol (IP) address.

12. The method of claim 1, wherein the topology-aware address comprises at least one bit that is configured to restrict forwarding of the one or more packets to at most n different destination addressable computing elements having a different given physical topology attribute relative to a corresponding physical topology attribute of the first addressable computing element, where n is greater than one.

13. The method of claim 1, wherein the topology-aware address comprises at least one bit that is configured to ensure delivery of the one or more packets to at least one addressable computing element having a given specified physical topology attribute and to prevent delivery of the one or more packets to addressable computing elements not having the given specified physical topology attribute.

14. The method of claim 1, wherein the first virtual machine is in a different data center location than the second virtual machine.

15. The method of claim 1, wherein the first virtual machine is resident on the same server as the second virtual machine.

16. A non-transitory processor-readable storage medium having embodied therein executable program code that when executed performs the method of claim 1.

17. An apparatus comprising:
a memory; and
a processor operatively coupled to the memory and configured to forward one or more packets from a first addressable computing element to at least a second addressable computing element based on a topology-aware address assigned to the second addressable computing element;

wherein the topology-aware address comprises a set of identifiers representing one or more topology attributes associated with the second addressable computing element;

wherein the first addressable computing element comprises a first virtual machine and the second addressable computing element comprises a second virtual machine; and wherein the topology-aware address comprises at least one indication used to control a number of different destination virtual machines having one or more specified physical topology attributes that the one or more packets are forwarded to, the number of different destination virtual machines being greater than one; and wherein the one or more specified physical topology attributes are defined relative to corresponding specified physical topology attributes of a locality of the first addressable computing element.

18. The apparatus of claim 17, wherein the one or more packets from the first addressable computing element are also forwarded to one or more other addressable computing elements having at least one physical topology attribute in common with the second addressable computing element.

19. The apparatus of claim 17, wherein the set of identifiers representing the one or more physical topology attributes comprise one or more of a data center location identifier, a rack identifier, a server identifier, a socket identifier, a core identifier, and a hyper-thread identifier.

20. A method comprising:
generating an instruction from an application program to instantiate an addressable computing element at a designated topological location in a computing system; and
providing the instruction to the computing system to instantiate the addressable computing element at the designated topological location;
wherein the application program is implemented using a first virtual machine;
wherein the addressable computing element comprises a second virtual machine; and
wherein the designated topological location comprises a location having one or more specified physical topology attributes defined relative to corresponding physical topology attributes of a locality of the first virtual machine; and
wherein the method is performed by at least one processing device comprising a processor coupled to a memory.

21. The method of claim 20, wherein the instruction identifies a specific topological location in the computing system at which to instantiate the addressable computing element.

22. The method of claim 20, wherein the instruction comprises a structured Media Access Control (MAC) address which serves as a parameter to an application programming interface call to start one or more virtual machine (VM) instances at the designated topological locations.

23. A network comprising:

a plurality of virtual machines; and physical infrastructure upon which the plurality of virtual machines are instantiated;

wherein one or more packets are forwarded from a first virtual machine to at least a second virtual machine based on a topology-aware address assigned to the second virtual machine;

wherein the topology-aware address comprises a set of identifiers representing one or more specified physical topology attributes associated with the second virtual machine;

wherein the topology-aware address comprises at least one indication used to control a number of different destination virtual machines having one or more specified topology attributes that the one or more packets are forwarded to, the number of different destination virtual machines being greater than one; and wherein the one or more specified physical topology attributes are defined relative to corresponding specified physical topology attributes of a locality of the first addressable computing element.

24. The network of claim 23, wherein the set of identifiers representing the one or more physical topology attributes comprise one or more of a data center location identifier, a rack identifier, a server identifier, a socket identifier, a core identifier, and a hyper-thread identifier.

* * * * *